(12) United States Patent
Amani

(10) Patent No.: US 10,354,101 B1
(45) Date of Patent: Jul. 16, 2019

(54) SYSTEM FOR PROVIDING AN ALTERNATIVE CONTROL INTERFACE TO SPECIALTY DEVICES

(71) Applicant: Majid Amani, East Greenwich, RI (US)

(72) Inventor: Majid Amani, East Greenwich, RI (US)

( * ) Notice: Subject to any disclaimer, the term of this patent is extended or adjusted under 35 U.S.C. 154(b) by 0 days.

(21) Appl. No.: 15/960,203

(22) Filed: Apr. 23, 2018

Related U.S. Application Data

(63) Continuation-in-part of application No. 14/740,181, filed on Jun. 15, 2015, now Pat. No. 9,952,811, which is a continuation-in-part of application No. 13/468,711, filed on May 10, 2012, now abandoned, and a continuation-in-part of application No. 14/463,626, filed on Aug. 19, 2014, now Pat. No. 9,058,143.

(60) Provisional application No. 61/869,615, filed on Aug. 23, 2013.

(51) Int. Cl.
| | |
|---|---|
| *G06F 15/00* | (2006.01) |
| *G06K 1/00* | (2006.01) |
| *H04N 1/00* | (2006.01) |
| *G06K 7/00* | (2006.01) |
| *G06K 19/06* | (2006.01) |
| *H04L 29/08* | (2006.01) |
| *G06K 7/14* | (2006.01) |
| *G06K 7/10* | (2006.01) |
| *G06F 16/955* | (2019.01) |

(52) U.S. Cl.
CPC ....... *G06K 7/0004* (2013.01); *G06F 16/9566* (2019.01); *G06K 7/10297* (2013.01); *G06K 7/1413* (2013.01); *G06K 19/06028* (2013.01); *H04L 67/02* (2013.01); *H04L 67/10* (2013.01)

(58) Field of Classification Search
CPC ............ G06K 7/0004; G06K 19/06028; G06F 17/30887; G06F 17/10297; G06F 17/1413; H04L 67/02; H04L 67/10
USPC ........................ 358/1.6, 1.15, 1.13, 1.14, 1.1
See application file for complete search history.

(56) References Cited

U.S. PATENT DOCUMENTS

| | | | |
|---|---|---|---|
| 9,952,811 B1 * | 4/2018 | Amani | H04L 67/02 |
| 2014/0049790 A1 * | 2/2014 | Nakamura | G06F 3/1298 |
| | | | 358/1.13 |
| 2017/0085725 A1 * | 3/2017 | Cho | H04N 1/0023 |

* cited by examiner

*Primary Examiner* — Douglas Q Tran
(74) *Attorney, Agent, or Firm* — Kenneth J. LuKacher Law Group; R. S. Rosenholm

(57) ABSTRACT

The invention provides an alternative applications programming interface (API) for a software application to interface with and to control the operation of a variety of one or more specialty devices, including specialty printing and specialty non-printing devices. The alternative API provides a superset of control functionality relative to an API that would typically be provided by a specialty device driver. In some embodiments, this alternative API is provided via a specialty device module (SDM) or a specialty printing module (SPM) that is remotely accessible to a software application via a computer network. The SDM or SPM can provide for interface and control of specialty devices that would otherwise be un-accessible to a software application via a specialty device driver, and can provide such locally or remotely accessible functionality to the software application, without necessarily requiring employment of a specialty device driver.

23 Claims, 8 Drawing Sheets

FIG. 7

ABC FOOD CORPORATION — 736A

P.O. Box 1234
Sometown, MA 03999
1-800-800-8000

Store: Food Shops 2201
ROUTE 117
Warwick, RI 02912 — 736B
CUSTOMER # 024985
06/14/2012  10:28:41 PM

| Qty | UPC | Item Description | Price | Ext Price |
|---|---|---|---|---|
| 1 | 4000112202 | Sparklg Bev, Orange, 11OZ | 19.65 | 19.65 |
| 1 | 4000112203 | Detox Bev, Lemon, 16OZ | 36.46 | 36.46 |
| 7 | 4000112204 | Instant Natural Bev, 7OZ | 13.22 | 92.54 |
| 9 | 4000112205 | Sparklg Bev, Apple, 25OZ | 13.57 | 122.13 |
| 9 | 4000112206 | Key Lime Soda, 24PK, 12OZ | 24.00 | 216.00 |
| 5 | 4000112207 | Sparkling, Limonata, 11OZ | 19.75 | 98.75 |
| 32 | | Subtotal, Beverages | | 585.53 |
| 8 | 4000112310 | Chocolate Fudge Birthday | 34.89 | 279.12 |
| 8 | 4000112311 | Chocolate Double Dare, 24OZ | 29.60 | 236.80 |
| 8 | 4000112312 | Cherry-Choco Lovers Cake | 32.95 | 263.60 |
| 8 | 4000112313 | Pineapple Rum Cake, 33OZ | 26.92 | 215.36 |
| 8 | 4000112314 | Key Lime Rum Cake, 16OZ | 14.58 | 166.64 |
| 8 | 4000112315 | Cinnamon Walnut Coffee | 20.95 | 167.60 |
| 5 | 4000112316 | Carrot Cake, 44OZ | 45.98 | 229.90 |
| 15 | 4000112317 | Yellow Cake Mix, 4PK, 15OZ | 23.36 | 350.40 |
| 68 | | Subtotal, Cakes | | 1,859.42 |

Total $2,444.95

SYSTEM FOR PROVIDING AN ALTERNATIVE CONTROL INTERFACE TO SPECIALTY DEVICES

This document Ser. No. (15/960,203), is a continuation-in-part of, and claims priority and benefit to, co-pending United States (U.S.) non-provisional utility patent application having Ser. No. (14/740,181), that was filed on Jun. 15, 2015, and that is entitled "System for Providing an Alternative Control Interface to Specialty Devices", and which is incorporated herein by reference in its entirety.

The document having Ser. No. (14/740,181), is also a continuation-in-part of and also claims priority and benefit to, then co-pending United States (U.S.) non-provisional utility patent application having Ser. No. (13/468,711), that was filed on May 10, 2012, and that is entitled "System for Optimally Generating Reports, and Report Generation Software for Enabling Same", and which is also incorporated herein by reference in its entirety.

The same document having Ser. No. (14/740,181), is a continuation-in-part of, and claims priority and benefit to, then United States (U.S.) non-provisional utility patent application having Ser. No. (14/463,626), that was filed on Aug. 19, 2014, and that is entitled "System for Providing an Alternative Control Interface to Specialty Printing Devices", which has since issued as U.S. Pat. No. 9,058,143, and which is incorporated herein by reference in its entirety.

The U.S. non-provisional (utility) patent application having Ser. No. (14/463,626), further claims priority and benefit to, U.S. provisional patent application having Ser. No. (61/869,615), that was filed on Aug. 23, 2013 and that is entitled "SYSTEM FOR PROVIDING AN ALTERNATIVE CONTROL INTERFACE TO SPECIALTY PRINTER DEVICES", and which is incorporated herein by reference in its entirety. All of the aforementioned patent applications are herein incorporated by reference in their entirety.

BACKGROUND OF THE INVENTION

Specialty devices are devices that are designed to perform actions in response to receiving commands to perform such actions. These devices have some communication capability via a wireless or wireline communications protocol. However, many of these devices upon being first sold, typically do not initially enjoy device driver support from a variety of, or from any operating systems, and as a result, these specialty devices are at least initially designed to be used without necessarily communicating with an operating system. Hence, these devices are characterized as being special, in that they are atypical relative to other devices that upon being first sold, enjoy device driver support from one or more operating systems. After being first sold, some specialty devices may gain device driver support over time in association with one or more operating systems.

Specialty printer devices are a sub-category of specialty devices. A specialty printer device is designed to transfer information onto various types of portable media. Such portable media typically excludes the standard 8.5×11 inch paper media, which is printed upon by many commonly available office printers. Upon first being sold, these types of devices are typically designed to perform functionality that may not be directly accessible via communication with most computer operating systems. Hence these devices are characterized as being special, as they are atypical relative to many commonly available office printers that are sold in high volume within the desktop computer market, and that typically enjoy some amount of operating system device driver support upon being first sold.

The discussion above is merely provided for general background information and is not intended to be used as an aid in determining the scope of the claimed subject matter.

BRIEF DESCRIPTION OF THE INVENTION

The invention is a method, system and apparatus for providing an alternative applications programming interface (API), for a software application to interface with and control the operation of a variety of one or more specialty devices, some of which are also referred to herein as specialty printing devices. The alternative API provides a superset of control functionality relative to an API that is typically provided by a specialty device driver. In some embodiments, the alternative API is provided via a specialty device module (SDM), also referred to herein as a specialty device interface module (SDIM), and in some embodiments, a specialty printing module (SPM) that is remotely accessible to a software application via a computer network.

The SDM can provide for interface and control of specialty devices that would otherwise be un-accessible to a software application via a specialty device driver, and can provide such locally or remotely accessible functionality to the software application without necessarily requiring employment of a specialty device driver.

The SPM can provide for interface and control of specialty printing devices that would otherwise be un-accessible to a software application via a specialty printing device driver, and can provide such locally or remotely accessible functionality to the software application without necessarily requiring employment of a specialty printing device driver.

This brief description of the invention is intended only to provide a brief overview of subject matter disclosed herein according to one or more illustrative embodiments, and does not serve as a guide to interpreting the claims or to define or limit the scope of the invention, which is defined only by the appended claims.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention can encompass other equally effective embodiments. The drawings are not necessarily to scale. The emphasis of the drawings is generally being placed upon illustrating the features of certain embodiments of the invention. In the drawings, like numerals are used to indicate like parts throughout the various views. Differences between like parts may cause those parts to be indicated with different numerals. Unlike parts are indicated with different numerals. Thus, for further understanding of the invention, reference can be made to the following detailed description, read in connection with the drawings in which:

FIG. 7 illustrates a report that is rendered (printed) onto media of a specialty printer.

DETAILED DESCRIPTION OF THE INVENTION

Figure 1:
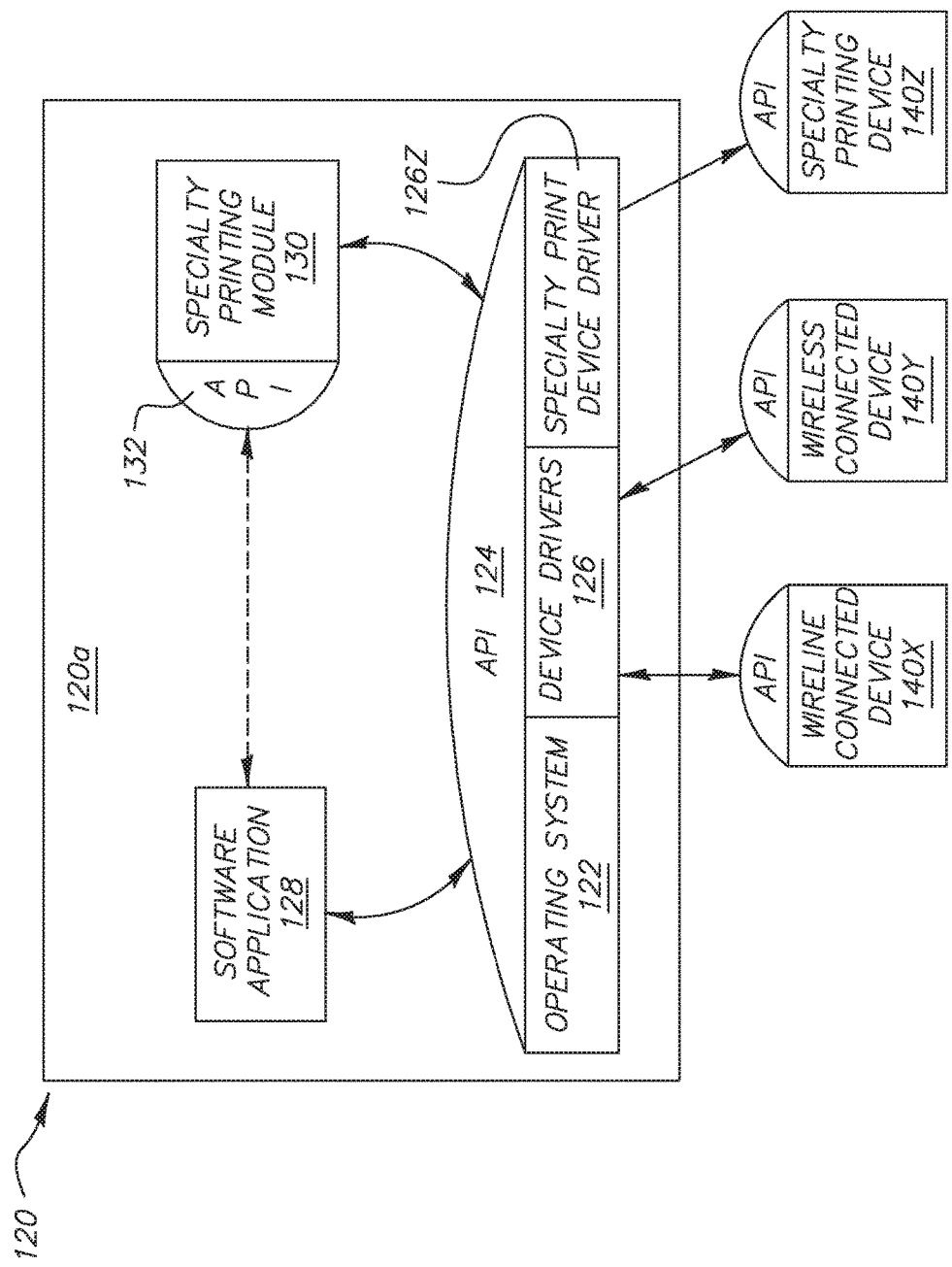
FIG. 1 illustrates communication between a specialty printing module and other software executing within a virtual address space of a computer system.

FIG. 1 illustrates communication between a specialty printing module (SPM) 130 and other software executing within a virtual address space 120a of a computer system 120. The SPM 130 in interchangeable with a specialty device module (SDM), which is also referred to herein as a specialty device interface module (SDIM). As shown, a software application 128 communicates with a specialty printing module 130 via an applications programming interface (API) 132 of the specialty printing module 130.

The software application 128 communicates with the SPM 130 via a first communications channel provided by the operating system (OS) 122. For example, in some embodiments, this first communications channel is a socket communication mechanism provided by the operating system 122 to the software application 128 and to the specialty printing module (SPM) 130. To exercise this socket mechanism, the software application 128 and the SPM 130 each communicate with the operating system 122 via exercise of an applications programming interface (API) 124 provided by the operating system 122 itself.

In other embodiments this communications channel is implemented via OpenURL( ) method call which is available within the applications programming interface (API) of a Java programming environment. A uniform resource locator (URL) is applied as an address of the SPM 130. A URL is a type of uniform resource identifier (URI). Another type of URI is a uniform resource name (URN).

In this circumstance, the URL address of the SPM 130 is employed by the software application 128 to access and to exercise the programming interface of the SPM 130. In other words, the SPM 130 programming interface is exercised by another software component, such as the software application, through the URL address. Also, in these circumstances, the software application 128 and the SPM 130 can reside upon the same computer and are local to each other, or can each reside on different computers. These different computers can be located proximate to or remote from each other. In other embodiments, a uniform resource name (URN) can be employed and mapped to a URL. Similar URL address based mechanisms can be employed to provide a communication for specialty printer discovery (See FIG. 6)

The operating system 102 communicates with various devices 140x-140z via a set of device drivers 126, including device driver 126z, which function as an extendable and configurable portion of the operating system 122. The operating system 122 interfaces with a wireline connected device 140x via a wireline connected device driver included within the set of device drivers 126. The operating system 122 interfaces with a wireless connected device 140y via a wireless connected device driver that is included within the set of device drivers 126. The operating system 122 interfaces with a specialty printer device 140z via the specialty printer driver 126z, that is also included within the set of device drivers 126.

In terms of functionality, the device drivers 126 each have an applications programming interface (API) that typically provides functional control of a device that is specific to a design of that particular device 140x-140z. This type of functional control is enabled via a set of commands that reflect a specific design of a device 140x-140z and that are processed when received by the device 140x-140z. These commands also referred to as providing a lower level (physical) access to and control of each of the devices 140x-140z.

Via the operating system 122 and its device drivers 126, the software application 128 can also communicate with each of the devices 140x-140z. However, such communication is limited to the limitations within each of the set of device drivers 126, including the device driver 126z. Typically, a device driver API provides access to specific functions of the device. As a result, the software application 128 is also limited to communicating (invocation of) specific functional commands of each of the devices 140a-140z via the operating system 122 and its device drivers 126.

Conversely, the specialty printing module 130 provides an alternative and different applications programming interface (API) 132 relative to that provided by the API 124 of the operating system 122 via its device drivers 126. Like that provided by the operating system 122, the specialty printing module (SPM) API 132 provides access to specific functions of a device 140x-140z and further provides a superset of the functional control that is provided by the operating system 122 via its drivers 126. This superset includes higher level functions for which the software application 128 can invoke (communicate) to the device 140z via the specialty printing module (SPM) API 132.

For example, the software application 128 can communicate a command that prints a report onto label media. The report can include multiple tables and fields that collectively define a printing of a label onto a product to be placed on sale. Some of these fields store values that are fixed while other fields store values that are accessed from other sources, or that are computed during the construction of the report. Some of these non-fixed and computed values are based upon limitations (design characteristics) that are specific to each of the devices 140x-140z. The report may also include barcodes and other graphics and can define an arrangement of fields having unusual patterns.

Placement (printing) of portions of the report, such as of a location of numerical fields and barcodes, may be subject to alignment and placement at locations onto printable output media that are based and determined upon one or more physical limitations (design characteristics) of the specialty printing device 140z. Rather than the software application 128 determining and specifying at what specific location a field should be placed (printed), via factoring characteristics and limitations of the device 140x-140z, the specialty printing module 130 will perform such a determination based upon general rules selected by the software application 128 and limitations (design characteristics) of the particular device 140x-140z.

These general rules are embedded into a report specification module (See FIG. 4), which can be executed by the software application 128. The software application 128 also invokes a report builder module to generate commands that are targeted and directed to a specific device 140x-140z. The specialty printing module 130 delivers the device targeted commands to the device 140x-140z via the operating system 122 and at least one of its device drivers 126.

In some circumstances, the specialty printing device 140z has a universal serial bus (USB) wireline connection to the computer system 120. In this circumstance, the operating system 122 and at least a USB device driver would be employed to communicate (deliver) the device targeted commands from the specialty printing module 130 to the specialty printing device 140z. In other circumstances, the specialty printing device 140z has a wireless WiFi communication connection to the computer system 120. Likewise, in this circumstance, the operating system 122 and at least a WiFi device driver would be employed to communicate (deliver) the device targeted commands from the specialty printing module 130 to the specialty printing device 140z.

Figure 3:
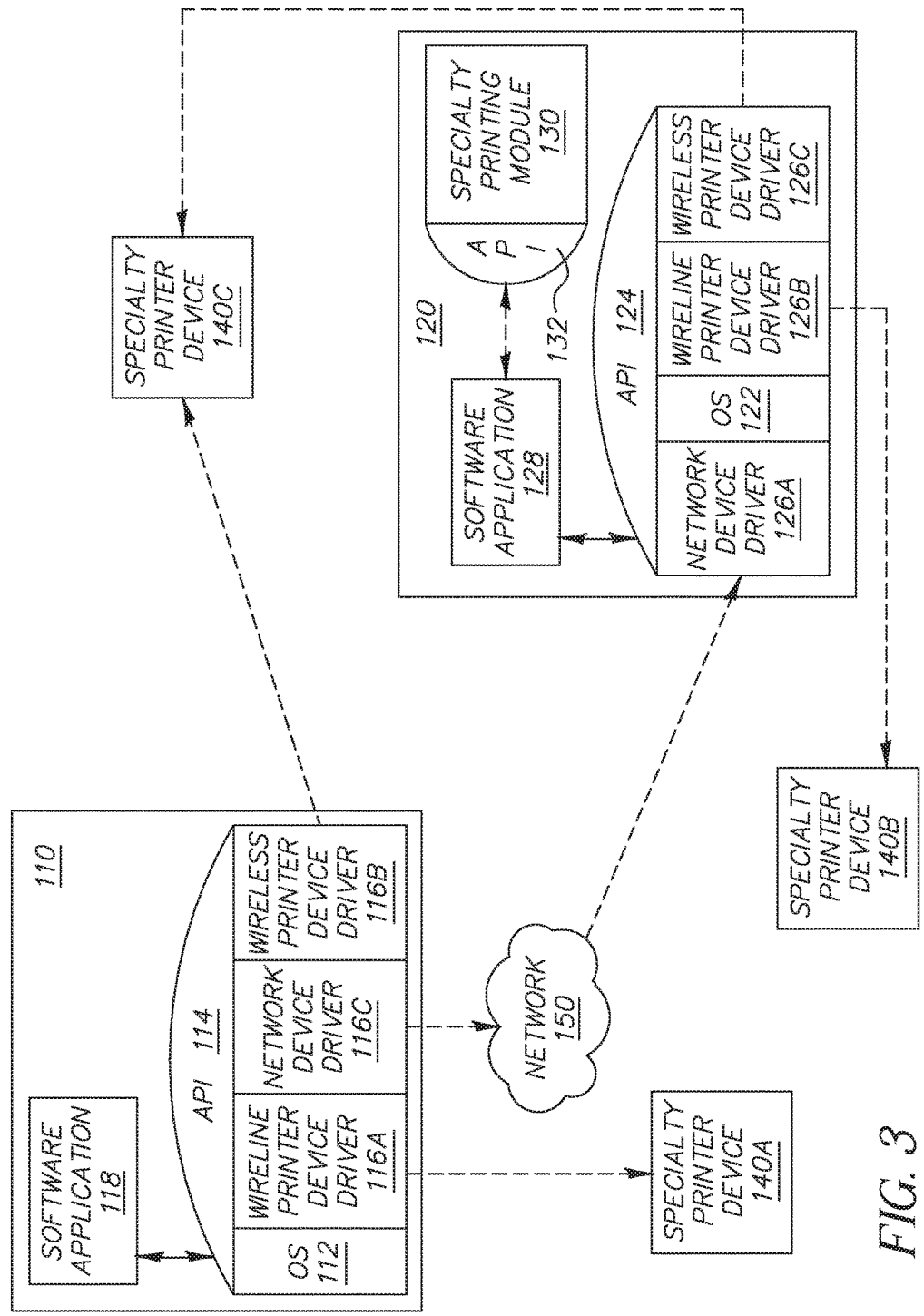
FIG. 3 illustrates communication between a plurality of host computer systems and a variety of output devices (specialty printers).

Furthermore, as shown in FIG. 3, another software application 118 executing on another computer system 110 may communicate with the specialty printing module 130 that is executing on this computer system 120, in order to access and control a specialty printing device that is not directly accessible from the another computer system 110 and upon which the software application 118 resides. At least one of various types of communications channels can be employed between the software application 118 and the specialty printing module 130 to enable communication to each other through a network 150. Such a communications channel, such as a socket to socket or OpenURL( ) accessed communication channel, for example, is typically accessible their respective operating systems (OS) 112, 122 via their respective applications programming interfaces (API) 114, 124.

Figure 2:
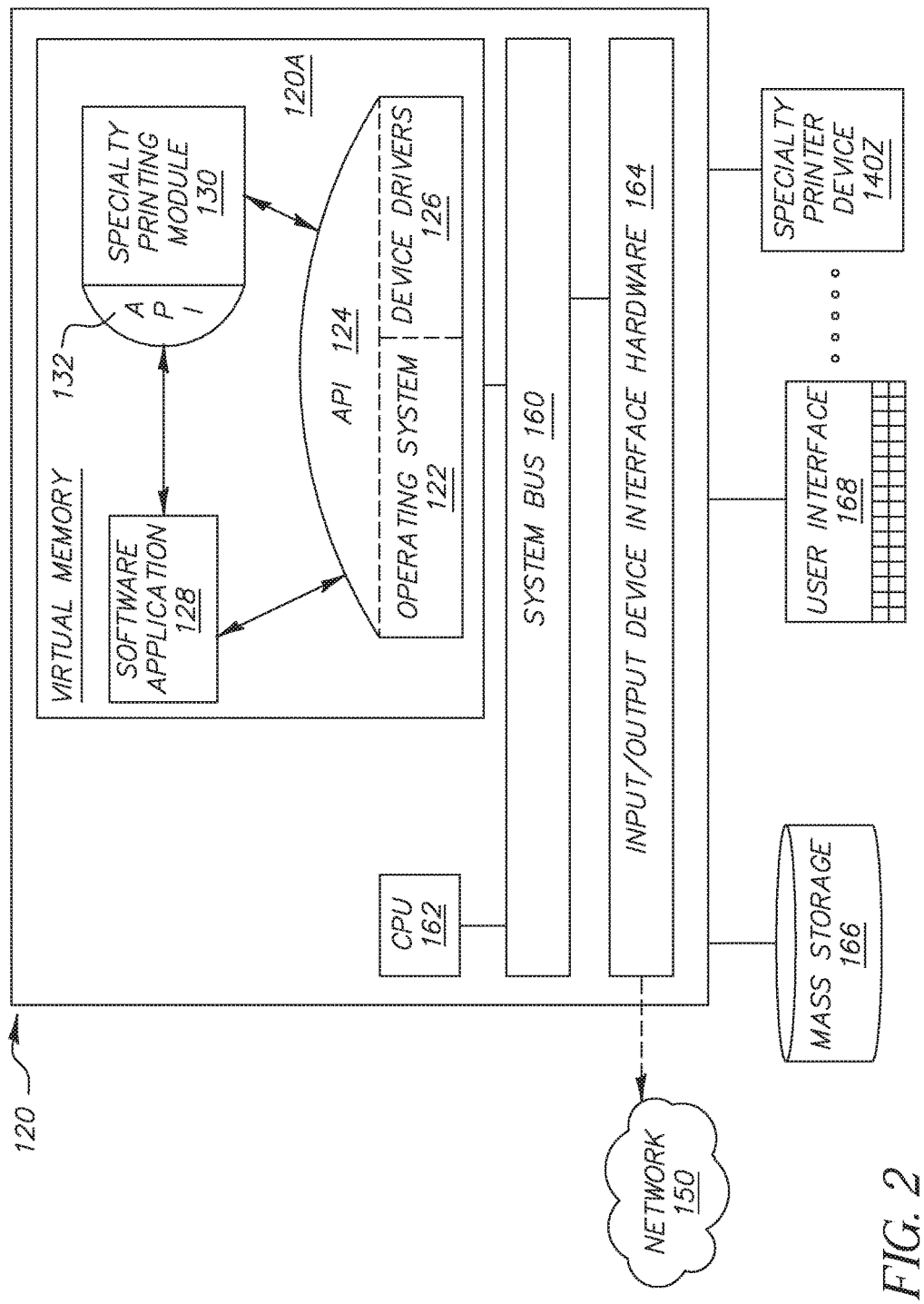
FIG. 2 illustrates a simplified representation of hardware and software residing within a host computer system.

FIG. 2 illustrates a simplified representation of hardware and software residing within the host computer system 120, also referred to herein as a computing platform 120. As shown, the computer system 120 includes at least one system bus 160 which is electronically connected to a central processing unit (CPU) and random access memory (RAM), which is employed to provide a virtual address space (virtual memory) 120a for storage of software executing on the computer system 120. Device interface hardware 164 is also electronically connected to the system bus 160 and is employed for performing transfer (input and output) of data between components 120a, 162 that are internal to the computer system 120 and devices 140z, 166-168 that are connected to it 120. A mass storage device, such as a hard disk 166 or other non-volatile data storage device, and user interface hardware, such as collectively a liquid crystal display (LCD) screen with mouse and a keyboard 168, are at least among the devices that are connected to the computer system 120. Also note that network interface hardware is employed for electronic connection to a communications network 150 and is not explicitly shown here.

FIG. 3 illustrates communication between a plurality of host computer systems 110, 120 and a variety of specialty printer devices 140a-140c. As shown, a host computer 110 includes hardware and various software components like that shown for computer system 120 in FIG. 2. The host computer system 110, also referred to herein as a computer system or a computer 110, has software including an operating system 112.

The operating system 112 includes an applications programming interface (API) 114, one or more device drivers 116a-116b, also referred to herein collectively as the device drivers 116 of computer 110. These device drivers 116 include such as one or more network device driver(s) 116c, and one or more specialty printer device drivers 126a-126b. These specialty printers 140a-140c are also referred to herein as specialty devices 140a-140c, because some specialty printers function more as an specialty type of device than an actual printing device.

The operating system 112 includes an API 114 that is a programming interface between the operating system 112 and each of one or more software application programs 118 executing on the computer system 110. The network device driver 116c interfaces with electronic hardware (electronics) that provides access to a particular type of communications network 150. This hardware may interface with a network having a wired topology, referred to herein as a wired or wireline type of network, such as an Ethernet network, or this hardware may interface with a network having a wireless topology, referred to herein as a wireless type of network, such as the wireless IEEE 802.11 network.

Device drivers may be assigned to multiple categories that overlap. For example, a device driver that interfaces with an Ethernet network would fall into both a network communications device driver and a wireline connected device driver category, and a device driver that interfaces with an IEEE 802.11 network, would fall within both a network communications device driver and wireless communications device driver category.

As shown in FIG. 3, the computer 110 has a wireline connection to a type of specialty printing device 140a, which is also generally referred to herein as a specialty output device, or as a specialty printer 140a. A specialty printer, is a type of output device that performs functions that are outside the capabilities of conventional type of paper document printer. A specialty printer can be designed to transfer information in the form of ink deposited onto media, or transfer information that is in a form other than ink, such as an electrical encoding of a numerical value into or onto appropriate media designed to store such a value.

Although a specialty output device (printer) has capabilities outside that of a conventional document printer, in some embodiments, a specialty printer can print a document onto media, such as in the form of ink onto paper media, or as in the form of ink onto non-paper media, or as in the form of depositing other than ink onto non-paper media. However, because some embodiments of a specialty printer can effectively print a document in some manner, such embodiments of a specialty printer may not be able to print a document as wells as, for example as quickly or as accurately, as some conventional document printers.

As an ink depositing type of printer, a specialty printer can be designed to deposit ink onto a special type of media, such as label media, or to deposit ink onto more common types of media, such as onto one or more sheets of paper for the purpose of printing documents. Label media, can be manufactured into many forms, and is typically manufactured and packaged into a roll of media, and is cut into individual sheets as needed. As cut, these sheets have an adhesive rear side and a printable forward side. The forward side is designed to store information in the form of ink deposits arranged to represent text fonts and graphics and images. These deposits can also include various types of printed barcode information. The text fonts can be arranged in various patterns, including horizontal lines, or other than horizontal lines, and can be patterned and directed along a horizontal direction, along a vertical direction and/or along a diagonal direction, for example.

Alternatively, a specialty printer can for example, store a numerical code inside of media that functions as a radio frequency identification (RFID) transponder. Such media is typically non-paper based media, such as that made from a polymer. The media may be packaged in a form that requires cutting or may be pre-separated and optionally stacked, prior to or after processing (printing) of the media. In this circumstance, a processed unit of media could function as an RFID transponder.

The media, whether or not it is made from a particular type of material, such as some type of paper or polymer, may require some form of delimitation and separation via a cutting or tearing action, to delimit and separate each unit of media. For example, with respect to label media, a unit of media could constitute one processed (printed) label. With respect to RFID media, a unit of media would be a processed (numerical code stored) RFID transponder.

As shown in FIG. 3, the computer 110 communicates with another computer 120 via a communications network 150. The computer 120 may be located within the same room, or the same building, may be located many miles from computer 110. As shown, the computer 110 has a direct connection to (1) output device, referred to herein as specialty printer 140a. The computer 120 has a direct connection to (2) associated output devices, also referred to herein as specialty printers 140b-140c. Note that each of the specialty printers 140a-140c, are not the same type of printer and are instead each designed to function as a different type of output device (specialty printer).

The computer 120 has a specialty printing (software) module 140 that interfaces with an operating system 122, via an API 124 of the operating system 122. The specialty printing module 130 also interfaces with a software application 128 residing and executing on the same local computer 120. The specialty printing module 130 also provides an application programming interface (API) 132 for one or more executing software applications 118, that reside on the remotely located computer 110.

This API 132 of the specialty printing module 130 is designed to provide a programming interface for local (128) and remotely located (118) software applications 118, 128 to interface with a particular specialty printer 140a-140c. A first portion of the API 132 is characterized as processing device specific (low level) commands, meaning that the specialty printing module 130 passes through commands received from the software application 118, 128 to the specialty printer 140a-140c. A second portion of the API 128 is characterized as processing other (high level) commands, meaning that the specialty printing module responds to directly, or translates a high level command into a set of one or more lower level commands for delivery to the particular specialty printer 140a-140c.

The design of the API 132 is an alternate and unique API as compared to what is typically provided by a device driver 116, 126. Furthermore, this API 132 is designed to be accessible from both local software applications 128 that are executing on the same computer 120, and designed to be accessible from remote software applications 118 via a network 150, that are executing on other remote computer systems, such as computer 110, for example.

Via the specialty printing module 130 and network 150, the software application 118 executing on computer 110, can access either or both of the remotely located specialty printers 140b-140c. Furthermore, this remotely located software application 118 can access these printers via a uniformly designed API 132 that is provided by the specialty printing module 140. Likewise, the software application 128 that resides local to computer 120, can also access and interface with these specialty printers 140b-140c, which are directly accessed by computer 120, via the same uniformly designed API 132 provided by the specialty printing module 130.

Without the specialty printing module 130, the software application 118 would have no access to the specialty printers 140b-140c, given that there is no other mechanism available to the software application 118 providing such access. Without the specialty printing module 130, the software application 128 would be required to interface with the specialty printer 140b via a device driver 126b of a first particular design and required to interface with specialty printer 140c via device driver 126c of a second particular design. Because specialty printers 140b and 140c each have a different function and design relative to each other, the device drivers 126b and 126c would likewise be expected to each have a different design relative to each other, and furthermore, each of the device drivers 126b and 126c would each likely provide a API that is separately and differently designed relative to each other.

With separate and differently designed device drivers 126b-126c, the software application 128 would be required to include additional software to separately interface with each of both of the device drivers 126b-126c. Furthermore, at least one or both of these device drivers 126b-126c will likely provide a more limited programming interface, and likely provide a programming interface that is a subset of that provided by the specialty printing module (SPM), to each specialty printer 140b-140c.

Importantly, the specialty printing module 130 provides to the software application 118 of computer 110, an indirect connection to the (2) specialty printers 140b-140c of computer 120, via the API 132 of the specialty printing module 130. The specialty printing module 130 also provides its API 132 to a software application 128 that is executing local to it 130 on the computer 120.

Figure 4:
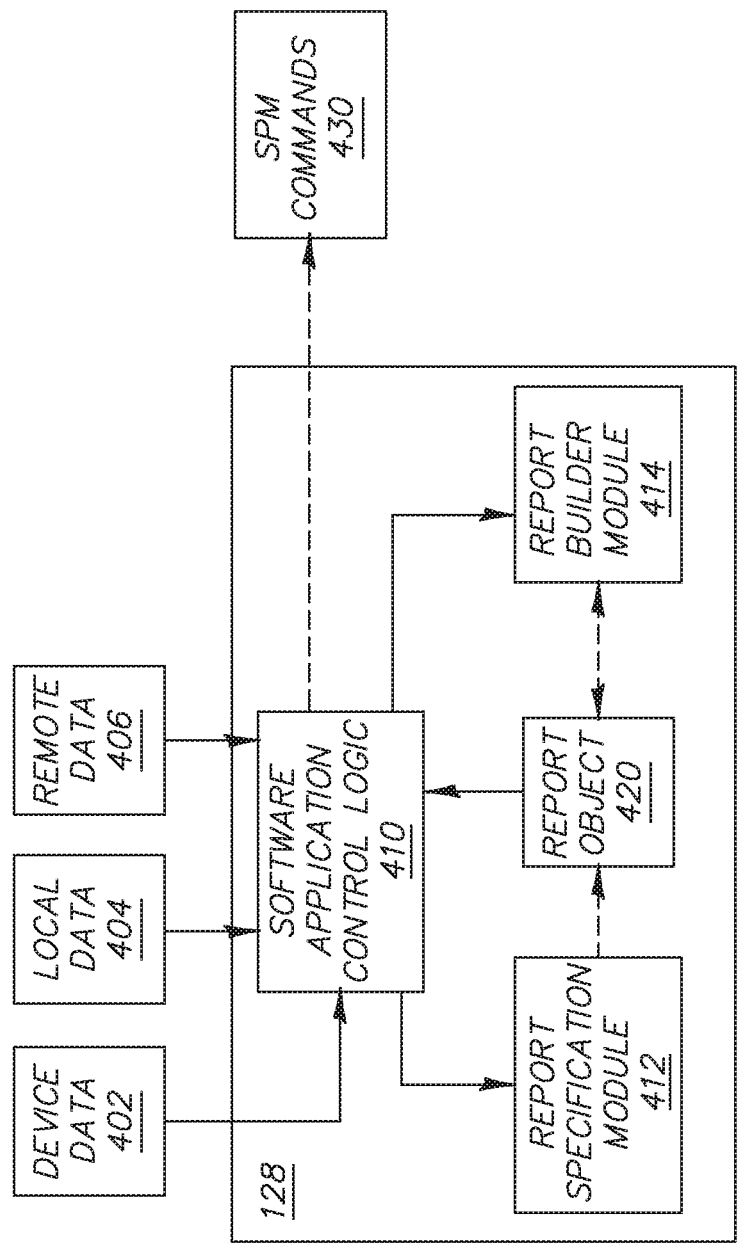
FIG. 4 illustrates a simplified representation of the internals of an embodiment of the software application of FIG. 3.

FIG. 4 illustrates a simplified representation of the internals of an embodiment of the software application of FIG. 3. As shown, the software application 128, includes control logic 410 that is designed to control operation of the software application 128. Via execution of the control logic 410, the software application 128 inputs device data 402, local data 404 and/or remote data 406.

Device data 402 is encoded information that describes characteristics and limitations of a specialty printing device 140a-140c whose operation is to be controlled via commands within a report that are to be generated by the software application 128. Data, including device data 404, can also be accessed from a local source 404 and/or from a remote source 406. Such data can include for example, static information such as a number of columns for printing, or include dynamic information such as date and time information.

The software application control logic 410 executes a report specification module 412 for defining a structure of a report. The structure of the report is defined in terms of one or more tables, fields, barcodes etc. The report can define a sales receipt, optionally with total and subtotal values. The report specification module 412 generates a report object 420 which functions as a template for a report to be generated. The software application control logic 410 further initiates execution of a report builder module 414 that functions to complete construction of the report object 420. Within the report object 420, commands are generated to control operation of the specialty printing module (SPM) 130 and to control operation of a targeted specialty device 140a-140c. Collectively, these commands are referred to herein as specialty printing module (SPM) commands 430, or as specialty device module (SDM) module commands. These SPM or SDM commands are communicated from the software application 128 to the specialty printing module 130, or to the specialty device module (SDM), where applicable.

Figure 5:
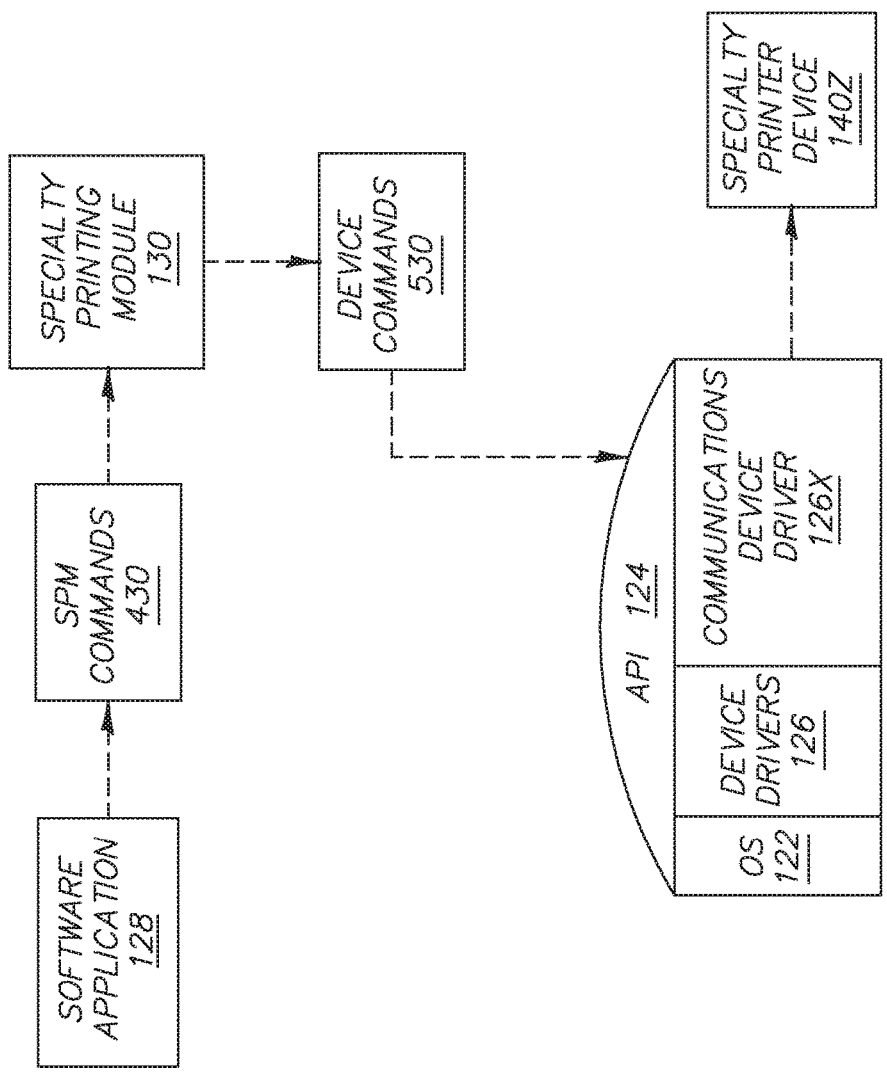
FIG. 5 illustrates a simplified representation of communication between the software application, specialty printing module, operating system and the specialty printer device.

FIG. 5 illustrates a simplified representation of communication between the software application 128 and the specialty printing device 140z via a communications device driver 126x. As shown, the software application 128 communicates SPM commands 430 to the specialty printing module 130 as described in association with FIG. 4. The specialty printing module 130 interfaces with the API 124 of the operating system 122 to communicate the device specific commands 530 to the specialty printing device 140z. As described herein, the SPM 130 in interchangeable with a specialty device module (SDM), which is also referred to herein as a specialty device interface module (SDIM). In a pass through mode, device specific commands embedded into the SPM commands 430 are passed through the SPM 130 and relayed to the specialty device 140z.

Notice that the SPM 130 communicates the device commands 530, not through a specialty printer device driver 126, but instead communicates the device commands 530 via a communications device driver 126x to the specialty printing device 140z. A communications device driver 126x is designed for a specific type of communication and is not specifically designed for control of the specialty printing device.

For example, in some circumstances, the specialty device driver 126x is connected via a universal serial bus (USB) wireline type of connection. In this circumstance, the communications device driver 126x is a universal serial bus (USB) device driver. This USB device driver 126x, is a device driver that is not required to be designed in accordance with a specific set of design characteristics of the specialty printing device 140z. In other words, no device driver that is specifically designed for the specialty printing device 140z is required to communicate with and control the specialty printing device 140z.

Likewise, in another circumstance, communication with an Ethernet connected specialty printing device 140z would simply require an Ethernet driver 126z. And likewise, in another circumstance, a WiFi connected specialty printing device 140z would simply require an WiFi driver. This type of arrangement unburdens the operating system 122 and its drivers 126 from being required to have device specific device drivers installed for all of its device drivers. Furthermore, it unburdens the operating system 122 from obtaining version updates for such specialty device drivers.

Figure 6:
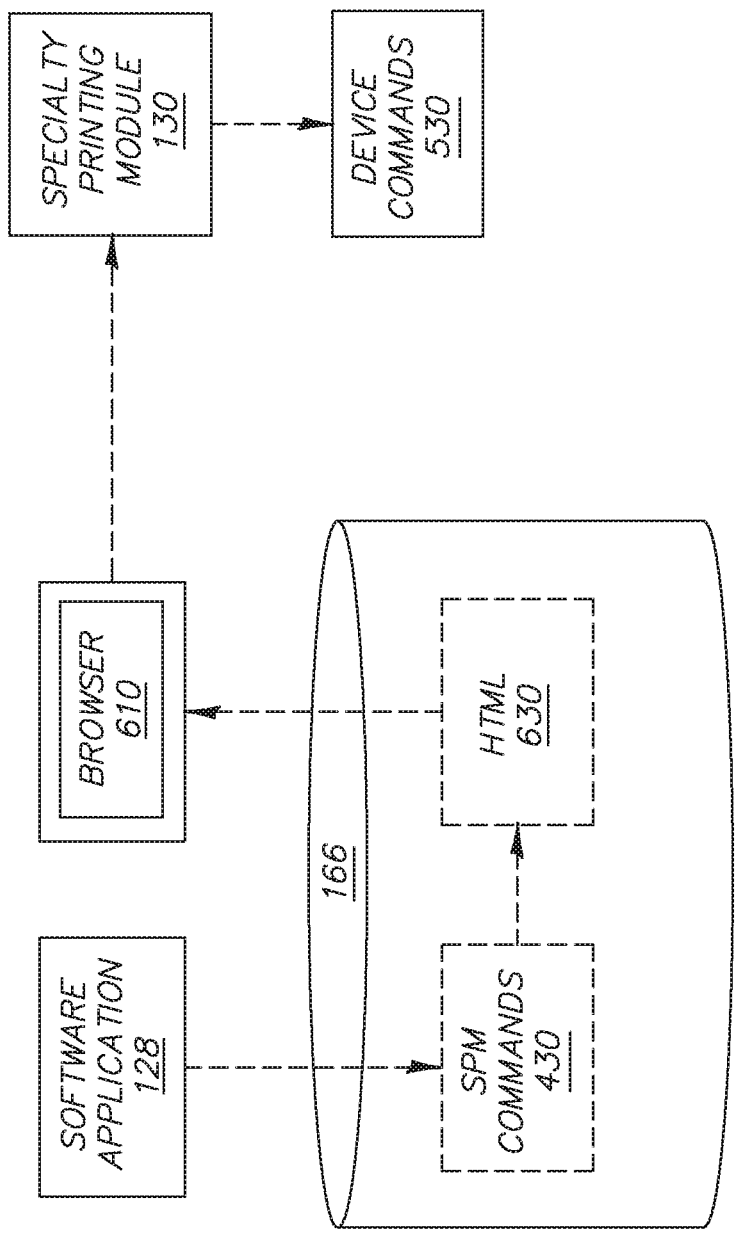
FIG. 6 illustrates a simplified representation of communication between the software application, an HTML browser and the specialty printing module.

FIG. 6 illustrates a simplified representation of communication between the software application 128, an HTML browser 610 and the specialty printing module 130. The SPM 130 in interchangeable with a specialty device module (SDM), which is also referred to herein as a specialty device interface module (SDIM). As shown, the software application 128 can store SPM commands 430 into a set of hypertext markup language (HTML) 630. The HTML 630 is input and processed by a (Internet Web) browser program 610.

The HTML 630 can direct the browser program 610 to display a list of actions to be executed at the option of a user that is interfacing with the browser program 610. Each action can be represented as text that is read by the user. Upon activation (selection) of the text by the user via a pointing device or keyboard input, for example, the browser program 610 communicates the SPM commands 430 to the specialty printing module (SPM) 130. And as described in association with FIG. 4, the SPM 130 module communicates any device specific commands 530 to the specialty printing device 140z via the operating system 122 and at least one of its device driver(s) 126x.

The SPM 130 receives and processes commands that are transmitted directly or indirectly from a software application 128. In some embodiments, the programming interface that resides in between the SPM 130 and the software application 128, is configured to enable transfer of one or more uniform resource locator (URL) addresses from the software application 128 to the SPM 130. These URL addresses can include a success URL address and a failure URL address. A success URL address is a URL address of a software component, typically the URL address of the software application 128 itself. A failure URL address maybe the URL address of the software application 128 itself, or alternatively, a URL address of a software component other than the software application 128.

Upon successful completion of command processing, the SPM 130 will interact with the operating system to cause transition to execution of a software component addressed by the success URL address. Alternatively, if the command processing is unsuccessful, the SPM 130 will cause the operating system to transition to execution of a software component addressed by the failure URL address.

Optionally, the programming further enables return to the software application 128 of any data returned by the specialty printer 140x in response to its communication with the specialty printing module 130, while processing printing commands.

In some embodiments, the browser program is configured to list a specialty printer discovery action, that when selected, will search for and discover uniform resource locator (URL) addresses for each available specialty printer that resides within a particular network computing environment. Upon selecting a URL for a specialty printer, that printer can be communicated with from the software application 128 via the SPM 130.

FIG. 7 illustrates a report that is rendered (printed) onto media of a specialty printer. A report is defined to include one or more tables, while each table is defined to include one or more fields. As shown, an embodiment of a report 710 includes (3) tables 736a-736c. These tables 736a-736c can be rendered (printed) as a report that constitutes one label that is printed onto an adhesive-backed media, or rendered onto an electronic user interface display, or rendered (printed) onto a portion of a roll of journal receipt paper, for example.

Each table 736a-736c is positioned either at an absolute location within boundaries of the report 710, or positioned at a location that is relative to a location of another table that is included within the same report 710. Each table 736a-736c includes one or more fields. As shown, the table 736c includes fields 737a-737e which each appear to function as a title or label of a column of text within the report 710.

Each field 737a-737e is positioned either at an absolute location within boundaries of the table 736c, or is positioned at a location that is relative to that of a location of another field that is included within the same table 736c. Each field represents a portion of data of a report that is rendered (printed, written), for example, as text, a barcode, an image or the like.

Data of a report is divided into one or more data items. For example, a data item can be alphanumeric text that identifies a food item for sale, or alternatively could be alphanumeric text to quantify a price of a purchased food item. Each field, such as fields 748a-748e can include one or more data items. For example, field 748c can include (3) data items that are rendered and delimited by at least one comma text character. As a result, a definition of a report can vary substantially in relation to other reports, depending upon the number and types of defined tables, and upon the number and types defined fields within each defined table, and as a result, can specify a wide variety of arrangements of rendered (printed) information.

The subject matter described herein facilitates the convenience of printing a large amount of information in the form of a report, representing for example, a sales report, sales receipt, invoice, or inventory report, onto media being printed by a small portable hand held specialty printer. The media of a specialty printer is atypical, in that a specialty printer is typically not designed to print onto 8.5×11 inch sections (pages) of paper media, but instead, is typically designed to print on smaller dimensioned paper and non-paper media.

As described herein, the structure of a report is defined by a specification. A specification definition of a report defines the number and type of columns within a report, which are indicative of a horizontal width of a report, as printed. However, the specification does not limit the amount of input data received from one or more data sources that form rows within the report.

As a result, as the amount of input data within a particular report grows, the vertical length (number of rows) of the report grows. As the vertical length (number of rows) of a report grows, the printed length (vertical height) of the report grows in a direction that is parallel to a vertical dimension of media that is being printed.

For example, when printing to a roll of media via a specialty printing device, the vertical dimension of a roll of media is also the long dimension of the roll of media. Hence, a report including much data in many rows, can be printed onto the roll of media, often and typically without consuming the entire amount of available media of the roll of media to be printed.

As a result, even a large report including information listing (100) items sold, can be printed via a physically small hand held specialty printer that prints onto a roll of media. In this circumstance, each of the items sold is represented by a row of text within a table of a report being printed. Each row of text has a horizontal length (width) that fits within a horizontal width of the roll of media. However, each row of text consumes only a small portion of the roll of media along the long (vertical) dimension of that roll of media.

Consequently, a printing of a large amount of information can be conveniently performed by a relatively small, portable, and hand held specialty printer.

Specialty Devices

Optionally, the apparatus, methods and systems described above is employed to communicate and control specialty devices other than specialty printing devices. In some embodiments, a specialty device module (SPD) is substituted for the specialty printing module (SPM). The SPD is designed to communicate with and control specialty devices in the same manner as the SPM communicates with and controls specialty printers.

In some embodiments, the specialty device is a temperature measuring sensor device, also referred to herein as a temperature sensor device. The temperature sensor device is designed to measure temperature at a particular location, which is typically located away from a location of a computer executing the software application 128. The software application can query the temperature sensor device at periodic time intervals to obtain a current temperature reading of the temperature sensor, via the SDIM. In some embodiments, the temperature sensor device is a Monnit Wi-Fi temperature sensor which is designed to accurately measure temperatures between −40° C. to 85° C. This temperature sensor device is particularly suitable for monitoring changing temperatures within a facility or particular room within a facility.

More information is available at:
http://www.monnit.com/Products/Wireless-Sensors/Wi-Fi/Wi-Fi/Wireless-Temperature-Sensors In some embodiments, the specialty device is a water detector. The water detection device is designed to measure the presence of water at a location that is typically located at a particular location, which is located typically away from a location of a computer executing the software application 128. The software application can query the water detection device sensor at periodic time intervals, to obtain a current water presence reading of the water detection device, via the SDIM. In some embodiments, the water detection device is a Monnit water detection sensor device which is designed to transmit information to alert a property owner of potential property damage resulting from a water leak or flood. This type of sensor could also be employed to detect a lack of water condition, to detect if/when a supply of water is nearing or at depletion.

More information is available at:
http://www.monnit.com/Products/Wireless-Sensors/Wi-Fi/Wi-Fi/Wireless-Water-Detect-Sensors In some embodiments, the specialty device is an asset location and status monitoring device, also referred to herein as an asset locating device or asset tracking device. The asset locating device, tracks asset tags that are affixed to assets that could be potentially moved over time. In some embodiments, asset tags are designed to respond to a transmitted radio frequency identification (RFID) signal in real-time for up to the second reporting of asset location and/or status.

In some embodiments, the asset tag is supplied by Zebra WhereNet family of products, which supplies WhereTags that are fully sealed to support operation in both indoor and outdoor environments.

More information is available at:
https://www.zebra.com/us/en/products/location-solutions/wherenet/wheretag.html The present invention also provides for a non-transitory computer-readable medium, such as a portable memory device that is encoded with computer program(s) implementing the specialty printing module and/or the specialty device module, the report builder and other file types such as a specification, a file of SPM commands and a file including HTML as described above.

The apparatus, methods and systems that are described above are also employed to communicate and control specialty devices, being devices that provide functionality in addition to and/or separate from that of specialty printing devices. In other words, specialty devices are a superset of specialty printing devices, and are not necessarily specialty printing devices.

In some embodiments, a specialty device module (SDM), also referred to herein as a specialty device interface module (SDIM), is substituted for the specialty printing module (SPM), in the same matter as described with respect to embodiments associated with specialty printing devices and the specialty printing module (SPM). In other words, the SDIM is designed to communicate with and control specialty devices in the same manner as the SPM is designed to communicate with and control specialty printers.

Figure 8:
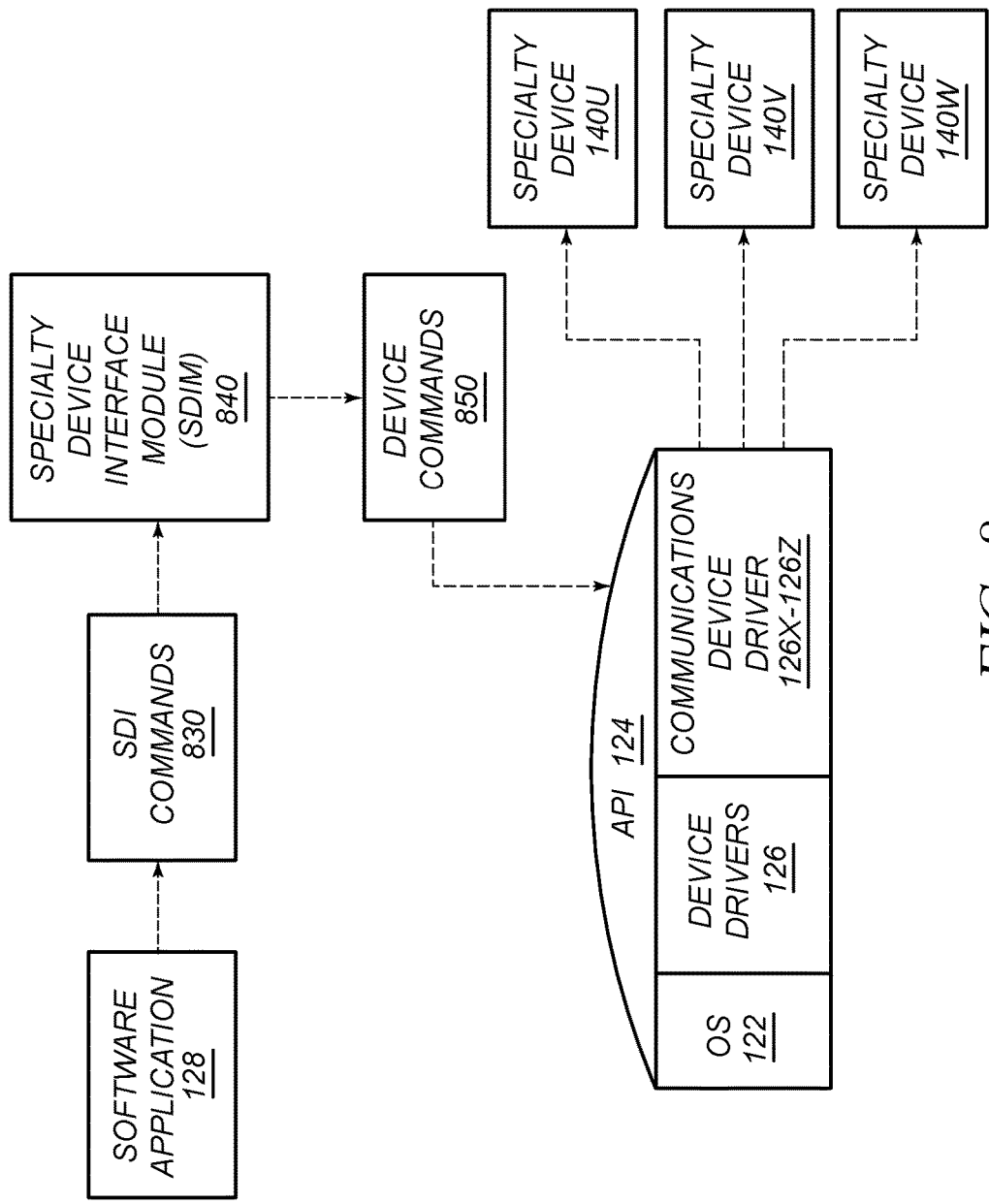
FIG. 8 illustrates a simplified representation of communication between the software application, specialty device interface module (SDIM), operating system and the specialty device.

FIG. 8 illustrates a simplified representation of communication between a software application 128, a specialty device interface module (SDIM) 840, and one or more specialty devices 140u-140w via one or more communications device driver(s) 126x-126z.

As shown, the software application 128 communicates specialty device interface (SDI) commands 830 to a specialty device interface module 840. The specialty device interface module 840 interfaces with an applications programming interface (API) 124 of an operating system 122, in order to communicate device specific commands 850 to one or more specialty devices 140w. In a pass through mode, device specific commands embedded into the SDI commands 830 are passed through the SDIM 840 and relayed to one or more specialty devices 140w.

Notice that in some circumstances, the SDIM 840 communicates the device commands 850, not necessarily through a specialty device driver 126, but instead communicates the device commands 850 via a communications device driver 126x to one or more specialty devices 140u-140w. One or more communications device drivers 126x-126Z are each designed for performing a specific type of communication, and each is not necessarily designed for specific control of a particular specialty device.

For example, in some circumstances, the specialty device driver 126x-126z is connected via a universal serial bus (USB) wireline type of connection. In this circumstance, the communications device driver 126x is a universal serial bus (USB) device driver. This USB device driver 126x, is a device driver that is not necessarily required to be designed in accordance with a specific set of design characteristics of the specialty device 140u-140w.

Likewise, in another circumstance, communication with an Ethernet connected specialty device 140u-140w would simply require an Ethernet driver 126x-126z. And likewise, in another circumstance, a Wi-Fi connected specialty device 140u-140w, could require at least a Wi-Fi device driver within the operating system 122. In other embodiments, Bluetooth communications are employed through a Bluetooth access point to interface with Bluetooth compatible specialty devices. Device drivers for communication are required for communication with such Bluetooth compatible specialty devices via a Bluetooth access point. In some circumstances, this type of arrangement can unburden the operating system 122 and its device drivers 126 from being required to include (load) device drivers designed for interfacing with specific specialty devices (specialty device drivers). Furthermore, it can unburden the operating system 122 from obtaining version updates for such specialty device drivers.

A specialty device can function as a radio frequency identification device (RFID) reader and/or encoder device, which are each respectively referred to as an RFID reader device or RFID encoder (writer) device. In some embodiments, the specialty device includes both RFID reader and RFID encoder (writer) functionality, and such a device is herein referred to as RFID reader and encoder device.

An RFID encoder device is designed to encode and store information into memory within an asset tag that is affixed to an object. The object can be, for example, an asset, such as a package that is being stored within a warehouse. Such information that is stored within the asset tag, can include information and/or various attributes associated with the object, being for example, size, volume, location and even temperature related information associated with the object to which the asset tag is affixed. Optionally, such information can also be stored into a database, that is accessible to the software application 128 and that is separate from information stored within the asset tag.

An RFID reader device is designed to access (read) information that is stored into the memory within an asset tag that is affixed to an object. Asset tags are generally designed to respond in real time when receiving a radio frequency identification (RFID) signal that is generated by an RFID reader device. The asset tag can respond to a signal transmitted by an RFID reader device, when it is located within an operational range of that particular RFID reader device. The asset tag responds by transmitting a signal that encodes information stored inside of the asset tag In accordance with some embodiments of the invention, the software application 128 can interface with multiple specialty devices, in order for the software application 128 to enable the specialty devices to interoperate and exchange information with each other.

For example, a first specialty device, being a network accessible temperature measuring device, can be employed to measure a temperature of a package containing frozen fish, while this package is located inside of a warehouse. A second specialty device, such as an RFID encoder, is employed to store the temperature information received from the first specialty device, into an asset tag that is affixed to the package of fish.

Note that optionally, other information, such as a time and a date associated with the temperature measurement, and a current location of the package within a particular warehouse, where applicable, can also be stored into the asset tag and/or into a separate data base that is accessible by the software application 128. In some embodiments, the specialty device includes both RFID reader device functionality and said RFID encoder device functionality, herein referred to as RFID reader and encoder device. Note that a barcode reader device is also referred to herein as a barcode scanning device, and a barcode printing device, is also referred to herein as a barcode encoder or as a barcode writing of barcode writer device.

In accordance with the invention, in addition to a specialty device functioning as a barcode printing device, a specialty device can function as a barcode reader device, in order to access information stored within a barcode. Such a barcode can be affixed to a package, or affixed to a tag that is affixed to a package, for example.

A barcode reader device is able to scan and decode the information encoded within in the barcode. In some embodiments, the scan method employs various imaging methods that may include projection of a beam of light, and capture of light reflecting off of a barcode, in response to the projection of the beam of light. A barcode can be imaged (printed, encoded, written) onto various media such as paper or plastic, or engraved on objects such as metals, and embedded in electronic documents, and displayed on display screens of electronic devices. In some embodiments, the specialty device includes barcode reader, RFID reader and RFID encoder functionality, in addition to barcode reader functionality.

In some use scenarios, the software application prompts a user, being a person who is interacting with the software application, to present a barcode for scanning via a specialty device that is a barcode reader. In some use scenarios, the barcode is printed or engraved onto a particular object, such as a package or product stored within a retail store or a warehouse. In some circumstances, a barcode is displayed onto a user interface screen of a smart telephone.

Note that in some use scenarios, a user interfaces with the system of the invention via a portable computer, such as via tablet or smart phone. A table or smart phone are each conventional devices that are made and sold in large volumes. Published software is available for communication with such conventional devices, and as a result, such devices are not considered specialty devices.

In a first use scenario, the software application 128 interfaces with such non-specialty devices through conventional means of communication, and exchanges communications with (to and from) one or more users. Such communications can prompt the system to send and receive communications to and from other specialty devices. Such communications can also prompt users to operate devices, whether those devices are specialty or non-specialty devices.

In a second use scenario, embodiments of the invention can be employed as an alternative control and communication interface to such non-specialty devices. However, such a second use scenario may not be necessary, if other conventional means of communication are readily available to interface with such non-specialty devices. But in some circumstances, use of an alternative communications interface, such as that provided by embodiments of the invention, may be preferred by users and/or designers of the software application 128.

With respect to the first use scenario, for example, a user located in a warehouse, receives a shipment of packages for storage into the warehouse, the user can access a website to access the apparatus/system of the invention, enter one or more commands through a non-specialty device, such as via a tablet, and is prompted to and/or can simply proceed to scan an existing barcode from each package, and optionally RFID encode each package, while the user is using such barcode and RFID specialty devices while such devices are interfacing with the system of the invention via a network, such as via the Internet or via a private network.

In some embodiments, for example, the system of the invention interfaces with a Code Reader™ 2600 barcode reading device, and/or with a Zebra RFD8500 RFID reader device. Barcodes stored into electronic documents can be scanned via invoking a Byte Scout barcode reading software program, for example.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus for enabling operation of a specialty device to be controlled from a software application; said apparatus including:
    a specialty device interface module that is accessible via a uniform resource locator (URL) address, and that is configured for communicating with a software application and configured for communicating with a specialty device,
    said software application executing on a first computer system and said specialty device interface module executing on a second computer system;
    said first computer system and said second computer system are in communication via a communications channel; and wherein
    said specialty device having functionality for performing actions in response to commands received from said specialty device interface module; and wherein said specialty device having a direct connection with said second computer system; and wherein
    said specialty device interface module provides control to said software application of at least a portion of said functionality of said specialty device, said specialty device interface module enabling information to be communicated from said software application to said specialty device for performing actions in response to commands received from said software application.

2. The apparatus of claim 1 including a means for said software application to determine an availability of access to one or more specialty devices via access to said specialty device interface module.

3. The apparatus of claim 1 wherein said specialty device interface module is accessible via a uniform resource locator (URL) address.

4. The apparatus of claim 1 wherein said specialty device interface module provides an application programming interface to said software application that is configured for control of at least one type of specialty device.

5. The apparatus of claim 4 wherein said application programming interface includes a pass through mode of operation wherein directives transmitted from said software application are re-transmitted by said specialty device interface module to a specialty device without modification.

6. The apparatus of claim 4 wherein said application programming interface further includes at least one return URL of a software component interfacing with said specialty device interface module, said software component being executed upon completion of actions of said specialty device interface module.

7. The apparatus of claim 4 wherein said application programming interface enables any data returned from said specialty device to be returned to said software application, in response to any communication between said specialty device and said specialty device interface module.

8. The apparatus of claim 1 wherein the specialty device is a barcode reader device.

9. The apparatus of claim 1 wherein the specialty device is a barcode writer device.

10. The apparatus of claim 1 wherein the specialty device is a radio frequency identification (RFID) reader device.

11. The apparatus of claim 1 wherein the specialty device is a radio frequency identification (RFID) encoder device.

12. The apparatus of claim 1 wherein the specialty device is incorporated into a system including a software application that interfaces with other non-specialty devices.

13. The apparatus of claim 1 wherein the specialty device is a temperature measuring sensor device.

14. The apparatus of claim 1 wherein the specialty device is a water detection device.

15. The apparatus of claim 1 wherein the specialty device is an object location and status monitoring device.

16. The apparatus of claim 1 wherein said first computing system and said second computing system are the same.

17. A system for enabling operation of a specialty device to be controlled from a software application; said system including:

a specialty device interface module that is accessible via a uniform resource locator (URL) address, and that is configured for communicating with a software application and configured for communicating with a specialty device, said software application executing on a first computer system and said specialty device interface module executing on a second computer system;

said first computer system and said second computer system are in communication via a communications channel; and wherein said specialty device having functionality for performing actions in response to commands received from said specialty device interface module; and wherein said specialty device having a direct connection with said second computer system; and wherein;

said specialty device interface module provides control to said software application of at least a portion of said functionality of said specialty device, said specialty device interface module enabling information to be communicated from said software application to said specialty device for performing actions in response to commands received from said software application.

18. The system of claim 17 wherein said specialty device interface module provides an application programming interface to said software application that is configured for control of at least one type of specialty device.

19. The system of claim 18 wherein said application programming interface includes a pass through mode of operation wherein directives transmitted from said software application are re-transmitted by said specialty device interface module to a specialty device without modification.

20. The system of claim 17 wherein the specialty device is a barcode reader.

21. The system of claim 17 wherein said direct connection is a type of connection including a wireline type of connection or a wireless type of connection.

22. A method for enabling operation of a specialty device to be controlled from a software application; said method including the steps of:

providing a specialty device, a specialty device interface module, a software application, a first computer system and a second computer system;

said specialty device interface module being accessible via a uniform resource locator (URL) address, and being configured for communicating with said software application and being configured for communicating with said specialty device; said software application executing on said first computer system and said specialty device interface module executing on said second computer system; and wherein said first computer system and said second computer system are in communication via a communications channel; and wherein said specialty device having functionality for performing actions in response to commands received from said specialty device interface module; and wherein said specialty device having a direct connection with said second computer system; and wherein;

said specialty device interface module provides control to said software application of at least a portion of said functionality of said specialty device, said specialty device interface module enabling information to be communicated from said software application to said specialty device for performing actions in response to commands received from said software application.

23. The method of claim 22 wherein said first computing system and said second computing system are the same.

* * * * *